(12) United States Patent
Conn

(10) Patent No.: US 9,696,892 B2
(45) Date of Patent: Jul. 4, 2017

(54) MECHANISM FOR FACILITATING DYNAMIC CHANGE ORIENTATION FOR EDIT MODES AT COMPUTING DEVICES

(71) Applicant: Jeremy Bert Conn, Portland, OR (US)

(72) Inventor: Jeremy Bert Conn, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 380 days.

(21) Appl. No.: 14/358,024

(22) PCT Filed: Dec. 26, 2013

(86) PCT No.: PCT/US2013/077861
§ 371 (c)(1),
(2) Date: May 13, 2014

(87) PCT Pub. No.: WO2015/099741
PCT Pub. Date: Jul. 2, 2015

(65) Prior Publication Data
US 2015/0186022 A1    Jul. 2, 2015

(51) Int. Cl.
*G06F 3/0484* (2013.01)
*G06F 3/0346* (2013.01)
*G06F 1/16* (2006.01)
*G06F 9/44* (2006.01)

(52) U.S. Cl.
CPC ........ *G06F 3/04847* (2013.01); *G06F 1/1694* (2013.01); *G06F 3/0346* (2013.01); *G06F 3/0484* (2013.01); *G06F 9/4443* (2013.01)

(58) Field of Classification Search
CPC ............................ G06F 3/04847; G06F 3/0346
See application file for complete search history.

(56) References Cited

U.S. PATENT DOCUMENTS

| 5,995,101 A * | 11/1999 | Clark ................. G06F 3/04895 715/711 |
| 2008/0259094 A1* | 10/2008 | Kim ...................... G06F 1/1626 345/651 |
| 2009/0009478 A1* | 1/2009 | Badali .................. G06F 1/1626 345/169 |

(Continued)

FOREIGN PATENT DOCUMENTS

| EP | 1983730 | 10/2008 |
| KR | 10-2013-0061993 | 6/2013 |
| WO | WO-2012-096451 | 7/2012 |

OTHER PUBLICATIONS

PCT/US2013/077861, "Notification of Transmittal of the International Search Report and the Written Opinion of the International Searching Authority, or the Declaration" mailed Sep. 25, 2014, pp. 12.

*Primary Examiner* — Anil Bhargava
(74) *Attorney, Agent, or Firm* — Blakely, Sokoloff, Taylor & Zafman LLP

(57) ABSTRACT

A mechanism is described for facilitating dynamic edit modes at computing devices according to one embodiment. A method of embodiments, as described herein, includes receiving a first request for accessing an edit mode at a computing device, where the first request is placed by turning the computing device from a first position to a second position, and allowing access to the edit mode, if the first request is determined to be intentional.

13 Claims, 6 Drawing Sheets

(56) References Cited

U.S. PATENT DOCUMENTS

| | | | |
|---|---|---|---|
| 2009/0113298 A1* | 4/2009 | Jung | G06F 3/011 |
| | | | 715/700 |
| 2010/0004031 A1* | 1/2010 | Kim | H04M 1/274525 |
| | | | 455/566 |
| 2010/0094681 A1* | 4/2010 | Almen | G06F 3/013 |
| | | | 705/7.29 |
| 2010/0218113 A1* | 8/2010 | White | G06F 1/1626 |
| | | | 715/746 |
| 2011/0167366 A1* | 7/2011 | Wagner | G06F 3/0483 |
| | | | 715/765 |
| 2012/0294436 A1 | 11/2012 | Park et al. | |
| 2012/0304084 A1 | 11/2012 | Kim et al. | |
| 2015/0242100 A1* | 8/2015 | Sohlstrom | G06T 3/60 |
| | | | 345/649 |

\* cited by examiner ion No.
PCT/US2013/77861, filed Dec. 26, 2013, entitled MECHANISM FOR FACILITATING DYNAMIC CHANGE ORIENTATION FOR EDIT MODES AT COMPUTING DEVICES by Jeremy Bert CONN, the benefit and priority are claimed thereof and the entire contents of which are incorporated herein by reference.

MECHANISM FOR FACILITATING DYNAMIC CHANGE ORIENTATION FOR EDIT MODES AT COMPUTING DEVICES

CROSS-REFERENCE TO RELATED APPLICATIONS

This patent application is a U.S. National Phase Application under 35 U.S.C. §371 of International Application No. PCT/US2013/77861, filed Dec. 26, 2013, entitled MECHANISM FOR FACILITATING DYNAMIC CHANGE ORIENTATION FOR EDIT MODES AT COMPUTING DEVICES by Jeremy Bert CONN, the benefit and priority are claimed thereof and the entire contents of which are incorporated herein by reference.

FIELD

Embodiments described herein generally relate to computers. More particularly, embodiments relate to a mechanism for facilitating dynamic change orientation for edit modes at computing devices.

BACKGROUND

Conventional operating systems and software applications at computing devices require users to actively access a setting area (e.g., local setting area, operating system-based setting area, etc.) in order to make changes (even relatively simple ones) to be able to perform any type of editing. Having to enter the setting area each time an editing change is to be made not only takes the user away from the relevant content and consequently, breaks the context, but also such measures can be inefficient, time-consuming, and error-prone.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a novel technique for facilitating a user to access content-wise and contextually-relevant control and edit area simply by rotating a computing device from its primary screen orientation (e.g., portrait) to its secondary screen orientation (e.g., landscape) or vice versa without requiring the user to navigate away from the content or access a separate settings area. In one embodiment, this technique provides that the user stay with the content and within the context while maintaining focus by delivering options that are pertinent to the experience and content at hand. Further, in one embodiment, give the access to the area is a simple gesture (e.g., turning the computing device sideways), the gesture continues to help maintain the perception of simply viewing the same experience in merely a different way.

Figure 1:
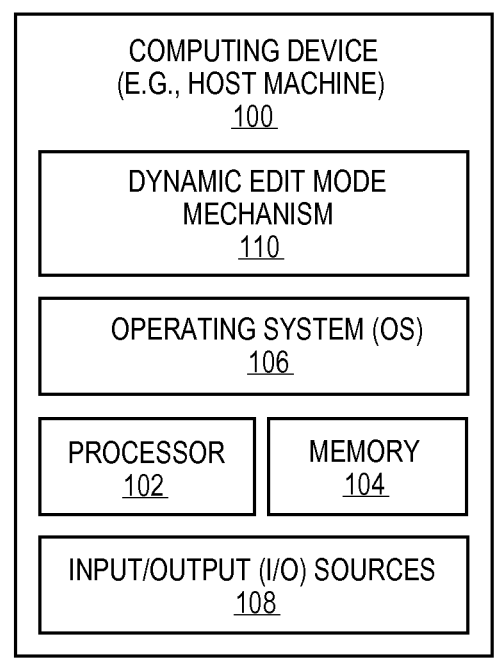
FIG. 1 illustrates a dynamic edit mode mechanism at a computing device according to one embodiment.

FIG. 1 illustrates a dynamic edit mode mechanism 110 at a computing device 100 according to one embodiment. Computing device 100 serves as a host machine for hosting dynamic edit mode mechanism ("edit mechanism") 110 that includes a combination of any number and type of components for facilitating dynamic and automatic change orientation for edit modes at computing device 100.

Computing device 100 may include large computing systems, such as server computers, desktop computers, etc., and may further include set-top boxes (e.g., Internet-based cable television set-top boxes, etc.), global positioning system (GPS)-based devices, etc. Computing device 100 may include mobile computing devices, such as cellular phones including smartphones (e.g., iPhone® by Apple®, BlackBerry® by Research in Motion®, etc.), personal digital assistants (PDAs), tablet computers (e.g., iPad® by Apple®, Galaxy 3® by Samsung®, etc.), laptop computers (e.g., notebook, netbook, Ultrabook™, etc.), e-readers (e.g., Kindle® by Amazon®, Nook® by Barnes and Nobles®, etc.), smart televisions, wearable devices, media players, etc.

Computing device 100 may include an operating system (OS) 106 serving as an interface between hardware and/or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", and "software package" may be used interchangeably throughout this document. Similarly, terms like "job", "input", "request" and "message" may be used interchangeably throughout this document.

Figure 2:
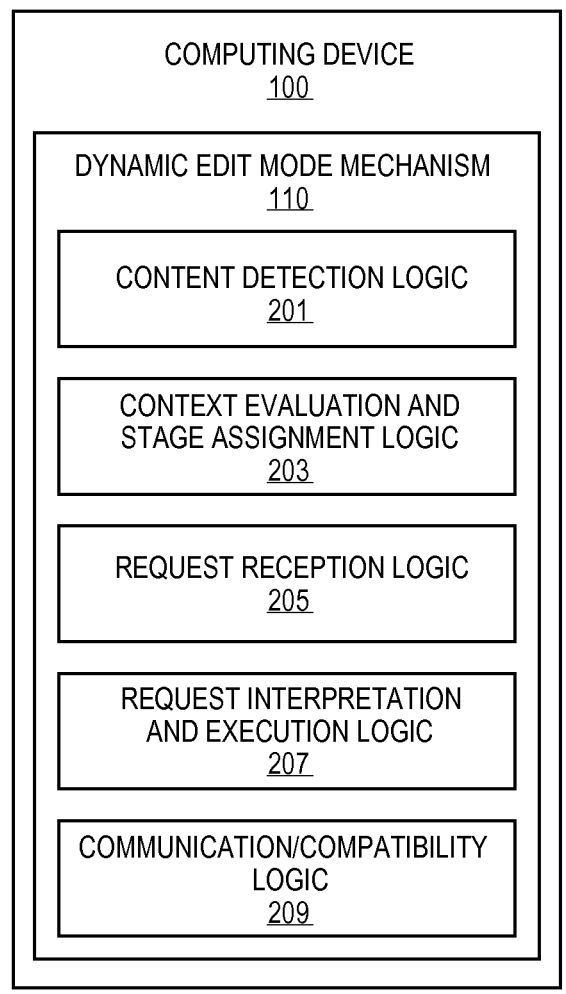
FIG. 2 illustrates a dynamic edit mode mechanism according to one embodiment.

FIG. 2 illustrates a dynamic edit mode mechanism 110 according to one embodiment. In one embodiment, edit mechanism 110 may be employed at computing device 100 serving as a host machine, such as a smartphone, a tablet computer, a laptop computer, etc. In one embodiment, edit mechanism 110 includes one or more components, such as content detection logic ("content logic") 201, context evaluation and stage assignment logic ("context logic") 203, request reception logic 205, request interpretation and execution logic 207, and communication/compatibility logic 209.

In one embodiment, edit mechanism 110 includes content/context detection logic 201 to detect the current content and context being in use at computing device (e.g., smartphone). For example, in some cases, a user may be having a cursory look at various news items from any number and type of sources where, in some cases, the user may be having a detailed look at a story relating to one of the new items. Accordingly, in one embodiment, content logic 201 detects the content that is being viewed by the user and further detects the context in which the content is being viewed. For example, in one embodiment, continuing with the news source example, content logic 201 detects what type of content is being accessed by the user at computing device 100.

Upon detecting the content, in one embodiment, context logic 203 determines the context in which the content is being accessed and used. For example, it is determined by context logic 203 whether the user is still in the initial stages of review the contents (such as still browsing or looking at the list of news items, news sources, etc., as opposed studying or reading a detailed news story). Accordingly, the content's context is determined and a stage is assigned to it, such as if the user is still browsing at the news items or news sources, the user is considered to be at a primary or edit stage, by context logic 203, where the user may be inclined to enter into the edit mode without having to lose the content and/or its context. In contrast, if the user is reviewing a detail news story (as opposed to browsing the list of news stories), the user is considered to be in a secondary or non-edit stage, by context logic 203, where the user is not likely to enter into the edit mode for the fear of losing the content and/or its context.

For example, at a stage where the use is viewing several news items from a couple of news sources (e.g., New York Times® ("NY Times"), Wall Street Journal® ("Journal"), etc.), the content is assigned a primary stage and throughout the primary stage, the user may enter into the edit mode by simple turning computing device 100 at, for example, a 45° or 90° angle as will be further described in this document. This is because since at the primary stage, the user's content can still be regarded as preliminary and superficial, where the context may not be as critical and therefore, the user may be inclined to enter the edit mode to, for example, delete an existing news source and/or add another news source (e.g., Los Angeles Times® ("LA Times"), etc. At this primary stage, the novel and innovative dynamic edit mode is made available to computing device 100. If, however, the user has already entered into reading a detailed news story, the content may now be regarded to be in a secondary or non-edit stage where the context becomes relatively important and the user may not be as inclined to enter the edit mode and rather concentrate on reading or sharing the news story. At this stage, the dynamic edit mode may not be available to computing device 100. In one embodiment, upon detecting of the content by content logic 201, context logic 203 may evaluate the detected content and assign or associate a stage (e.g., primary stage, secondary stage, etc.) to the content.

It is contemplated that embodiments are not limited to merely the primary and secondary stages and that any number and type of stages or contexts may be determined and accordingly associated with the content. Similarly, it is contemplated that the aforementioned news sources news items are merely presented as examples and for brevity, clarify, and ease of understanding, and that embodiments are not limited to such. For example, as opposed to the news items and the news sources, a user may be viewing current weather temperatures in Denver and Portland at Weather-.com®. In one embodiment, this may be regarded as a primary or edit stage and thus the user may simply twist computing device 100 to get to the edit mode to, for example, enter another city, such as Dallas, to the list. However, in one embodiment, if the user has already been viewing a detailed weather report (e.g., 5-day weather report and other details) regarding Denver, this may then be regarded as a secondary or non-editable stage where the dynamic edit mode may not be available. It is contemplated that embodiments are not limited to any particular type or number of websites or software applications and that the user may choose to access the dynamic edit mode while working with any number and type of websites and software applications, such as business applications, communication websites (e.g., Skype®, Viber®, Tango®, etc.), social and/or business networking websites (e.g., Facebook®, Twitter®, LinkedIn®, etc.), etc.

In one embodiment, a request for editing is received from the user at request reception logic 205. As aforementioned, the editing request may be received by simply twisting computing device at a particular or any number of angles, such as 45°, 75°, 90°, etc., or simply turned sideways at, for example, 90°, etc., or flipped over at a particular angle, etc., or by any combination thereof. For example, computing device 100 may be moved from portrait to landscape or vice versa. Embodiments are not limited to any particular manner or angle in which computing device 100 may be twisted or turned or flipped, etc. Further, the dynamic edit mode may be defined, modified, and facilitated according to default settings or user preferences as set forth by the user. In one embodiment, in order to access the dynamic edit mode, when the user turns (or twits or flips) computing device 100 in a particular matter (such as from portrait to landscape or vice versa) according to the default settings or the user preferences, this turning of computing device 100 may be received at request reception logic 205 as a request for editing via the dynamic edit mode.

In one embodiment, request interpretation and execution logic 207 receives evaluates and interprets the editing request received at request reception logic 205. For example, request interpretation and execution logic 207 may confirm that the request is indeed for editing purposes and that it is not merely done accidently or unintentionally, such as if the request is performed for at least a period of time (e.g., 2 seconds, etc.), it may be considered a request for editing; else, it may be discarded as an accidental or unintentional turning of computing device 100. For example, the user may turn computing device 100 (e.g., smartphone) from portrait to landscape simply to view a video clip on YouTube® or Netflix®, etc., and thus, the user may not have actually intended to go into the landscape mode to perform any editing; in this case, although the turning of computing device 100 may be received as an editing request at request reception logic 205, but upon interpretation of the editing request by interpretation and execution logic 207, it may be rejected by interpretation and execution logic 207 as being received in the secondary or non-editing stage and thus interpreted as accidental and/or unintentional.

In one embodiment, upon interpreting the editing request and once it is determined to be a genuine and intentional request for editing, request interpretation and execution logic 207 may then execute the request to be fulfilled through the dynamic edit mode. For example and in one embodiment, if the request is received during the secondary or non-editing stage of content viewing, the request may be denied as set forth in the default settings or user preferences. As aforementioned, during the secondary or non-editing stage, the context of the content being viewed by the user may be specific (such as watching a video on Netflix®, etc.) and it may not be inviting to pull the user away from the content or its context during this stage and thus, the editing request may be denied for being interpreted as accidental and/or unintentional.

However, in one embodiment, if the editing request is interpreted, by interpretation and execution logic 207, as being made during the primary or editing stage of content viewing and thus, it is regarded as timely and intentional, interpretation and execution logic 207 executes the editing request by allowing computing device 100 to enter into the dynamic edit mode where the user may perform any sort of editing (e.g., change settings or perform content addition, deletion, and/or modification, etc., relating to the software application being accessed and used by the user), as desired or necessitated by the user, without having to leave the content or its context. Upon completion of the editing process, the user may turn back computing device 100 to its previous position, such as from landscape to portrait or vice versa.

As with receiving an editing request, this turning back of computing device 100 may be regarded and received as an exit request at request reception module 205 and then interpreted and executed by interpretation and execution logic 207. For example and in one embodiment, if the user turns computing device 100 without saving the changes, the exit request may be interpreted as accidental or unintentional by interpretation and execution logic 207 and thus, it may not be fulfilled. However, if the editing is completed and the proposed changes have been saved by the user, the exit request may then be interpreted as timely and intentional by interpretation and execution logic 207 and thus, it may be processed so that computing device 100 may edit the dynamic edit mode and get back to the original content being viewed by the user before the editing request was received and processed.

Similarly, in one embodiment, computing device 100 may further include any number and type of touch/image components including (but not limited to) image capturing devices (e.g., one or more cameras, etc.) and image sensing devices, such as (but not limited to) context-aware sensors (e.g., temperature sensors, facial expression and feature measurement sensors working with one or more cameras, environment sensors (such as to sense background colors, lights, etc.), biometric sensors (such as to detect fingerprints, facial points or features, etc.), and the like. Computing device 100 may also include one or more software applications, such as business applications, social network websites (e.g., Facebook®, Google+®, Twitter®, etc.), business networking websites (e.g., LinkedIn®, etc.), communication applications (e.g., Skype®, Tango®, Viber®, etc.), games and other entertainment applications, etc., offering one or more user interfaces (e.g., web user interface (WUI), graphical user interface (GUI), touchscreen, etc.) via a display screen, while ensuring compatibility with changing technologies, parameters, protocols, standards, etc.

Communication/compatibility logic 209 may be used to facilitate dynamic communication and compatibility between computing device 100 and any number and type of other computing devices (such as a mobile computing device, a desktop computer, a server computing device, etc.), storage devices, databases and/or data sources (such as data storage devices, hard drives, solid-state drives, hard disks, memory cards or devices, memory circuits, etc.), networks (e.g., cloud network, the Internet, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.), wireless or wired communications and relevant protocols (e.g., Wi-Fi®, WiMAX, Ethernet, etc.), connectivity and location management techniques, software applications/websites, (e.g., social and/or business networking websites, such as Facebook®, LinkedIn®, Google+®, Twitter®, etc., business applications, games and other entertainment applications, etc.), programming languages, etc., while ensuring compatibility with changing technologies, parameters, protocols, standards, etc.

Although one or more examples (e.g., news sources, Weather.com®, turning computing device 110 at 90° or from portrait to landscape or vice versa, dynamic edit mode, smartphone, table computers, etc.) may be discussed throughout this document for brevity, clarity, and ease of understanding, it is contemplated that embodiments are not limited to any particular number and type of gestures, display panels, computing devices, users, network or authentication protocols or processes, or the like. For example, embodiments are not limited to any particular network security infrastructures or protocols (e.g., single-sign-on (SSO) infrastructures and protocols) and may be compatible with any number and type of network security infrastructures and protocols, such as security assertion markup language (SAML), OAuth, Kerberos, etc.

Throughout this document, terms like "logic", "component", "module", "framework", "engine", "point", and the like, may be referenced interchangeably and include, by way of example, software, hardware, and/or any combination of software and hardware, such as firmware. Further, any use of a particular brand, word, term, phrase, name, and/or acronym, such as "edit mode", "dynamic edit mode", "primary stage", "secondary stage", "first stage or mode", "second stage or mode", "turning", "twisting", "editing", etc., should not be read to limit embodiments to software or devices that carry that label in products or in literature external to this document.

It is contemplated that any number and type of components may be added to and/or removed from dynamic edit mode mechanism 110 to facilitate various embodiments including adding, removing, and/or enhancing certain features. For brevity, clarity, and ease of understanding of dynamic edit mode mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 3A:
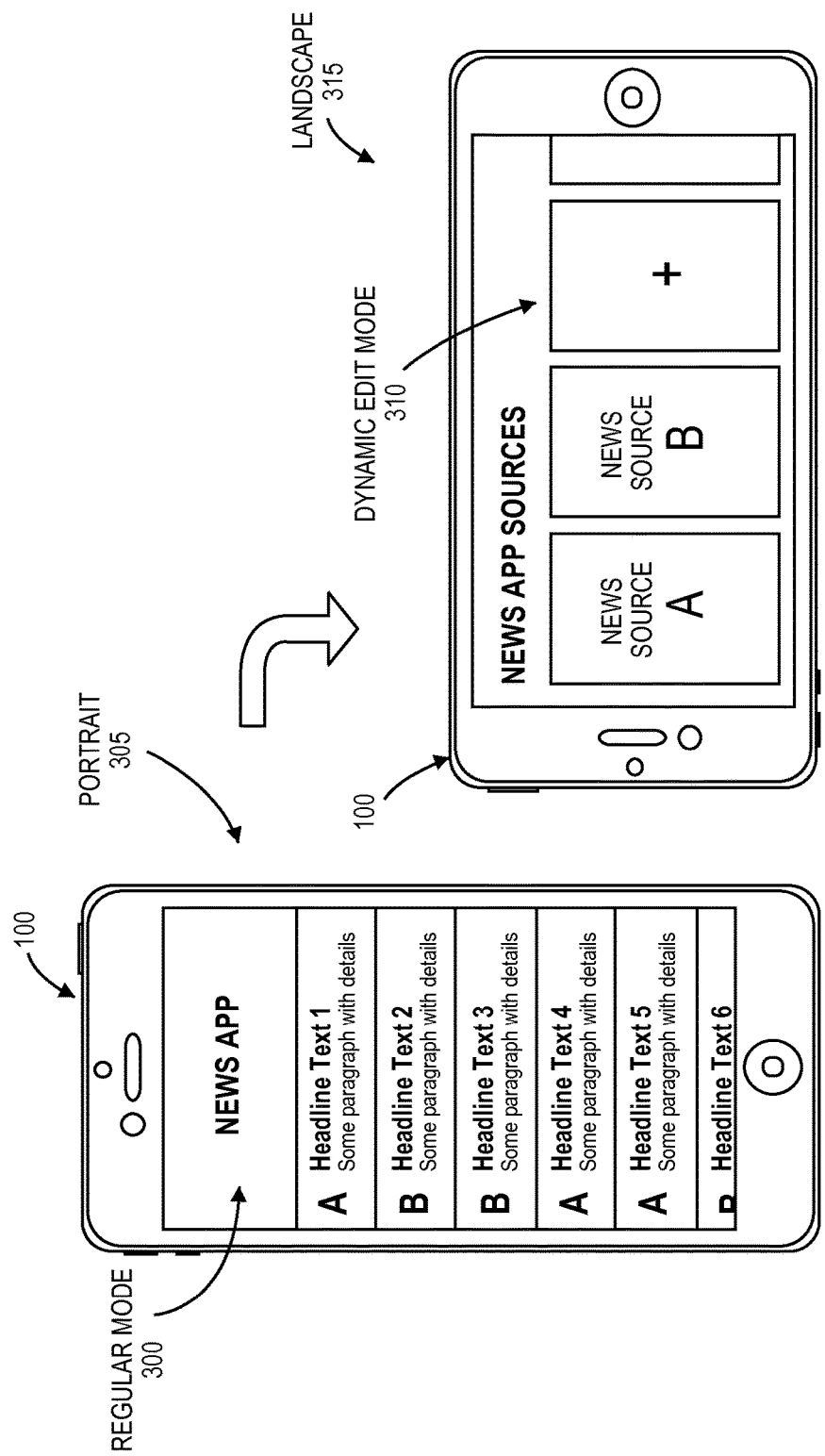
FIG. 3A illustrates a computing device having a dynamic edit mode mechanism of FIG. 1 according to one embodiment.

FIG. 3A illustrates a computing device 100 having a dynamic edit mode mechanism 110 of FIG. 1 according to one embodiment. In the illustrated embodiment, computer device 100 is shown to be in regular or default mode 300, such as computing device 100 illustrates a news application listing a number of news items (e.g., Headline Text 1, Headline Text 2, etc.) as provided by a number of news sources (e.g., news source A (e.g., NY Times), news source B (e.g., Journal), etc.) in portrait 305. At this point, the stage or context of the content is regarded as a primary or edit stage and thus, a user may simple turn computing device 100 into landscape 315 to switch from regular mode 300 to dynamic edit mode 310 for editing purposes. For example, as illustrated, the user may use dynamic edit mode 310 to edit the news sources by adding a new source by simply touching or clicking on the add option, such as the "+" illustrated here, or delete a news source, such as news source A or B, but simply clicking on or touching one or more of the existing the news sources to be removed. Similarly the other options, such as move option, may be provided to move the one or more news sources to have, for example, priority over other sources, such as moving news source B to have priority over news source A.

Figure 3B:
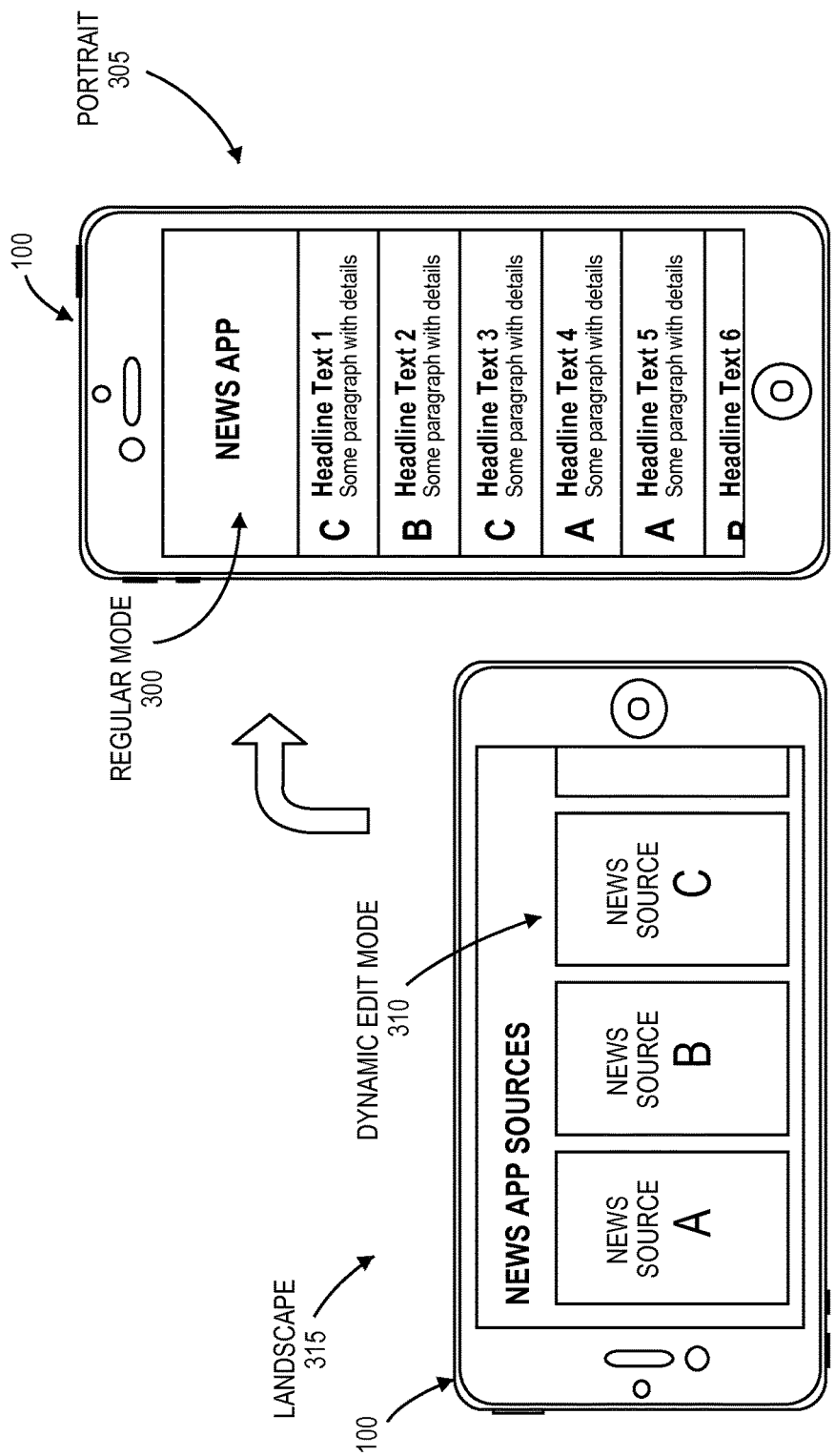
FIG. 3B illustrates a computing device having a dynamic edit mode mechanism of FIG. 1 according to one embodiment.

FIG. 3B illustrates a computing device 100 having a dynamic edit mode mechanism 110 of FIG. 1 according to one embodiment. In the illustrated embodiment, for example, the user chooses to add a news source, such as news source C, to the list of news source using dynamic edit mode 310 in landscape 315. Now, once the user has made the change, such as after having added news source C, the user may simply turn computing device 100 back to portrait 305 to exit dynamic edit mode 310 and return to regular mode 300 which now shows news items not only from the old/existing news sources A and B, but also from the newly-added news source C.

As aforementioned, it is contemplated that embodiments are not limited to only news applications or being in portrait or landscape modes or the like and that these illustrates are merely provided as examples for brevity, clarity, and ease of understanding. For example, in some embodiments, dynamic edit mode 310 may be provided in portrait 305 or sideways or when set in a flat position, etc., and similarly, regular mode 300 may be provided in landscape 315 or sideways or when in a flat position, etc.

Figure 5:
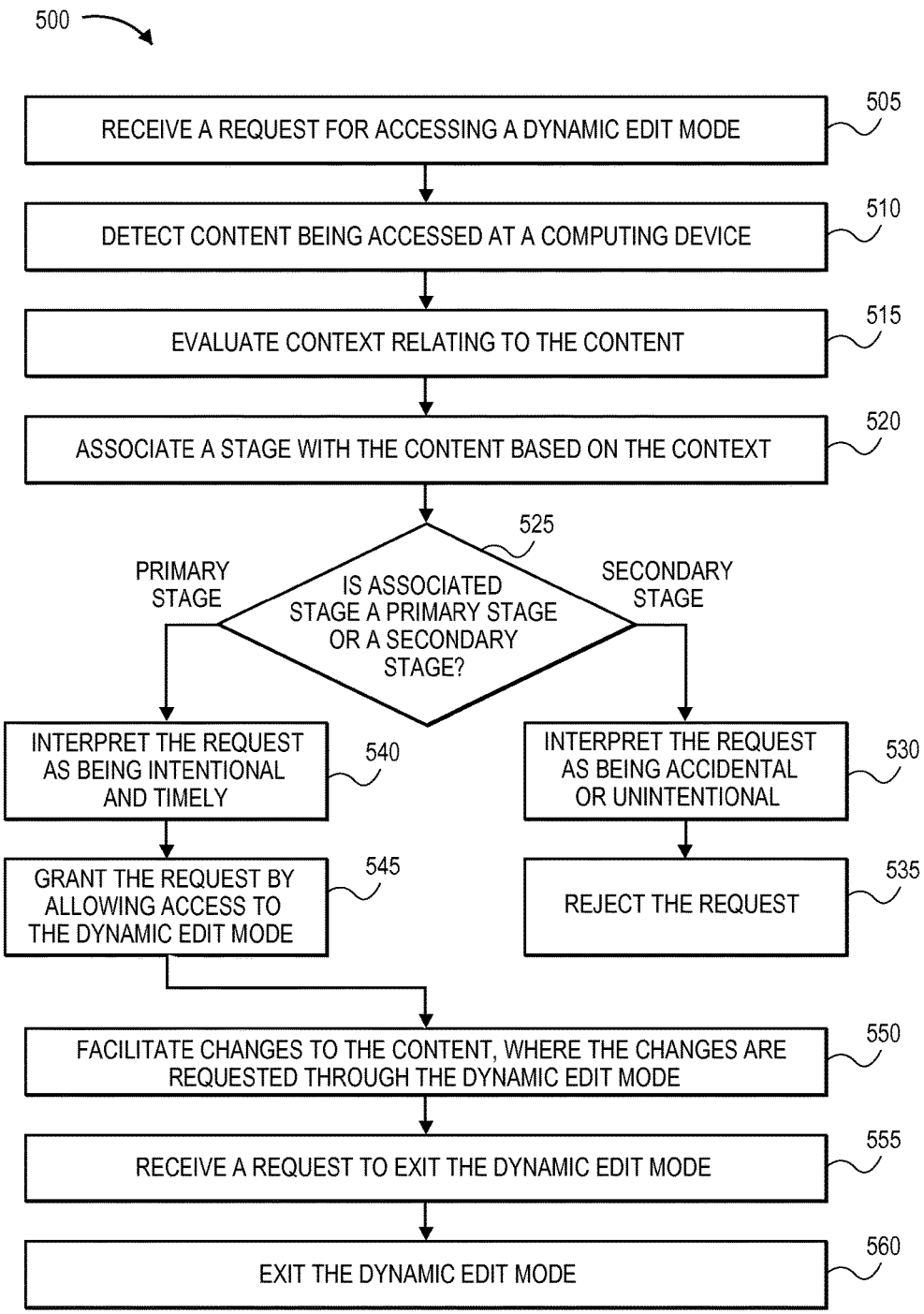
FIG. 5 illustrates a method for facilitating a dynamic edit mode at a computing device according to one embodiment.

Referring now to FIG. 5, it illustrates a method 500 for facilitating a dynamic edit mode at a computing device according to one embodiment. Method 500 may be performed by processing logic that may comprise hardware (e.g., circuitry, dedicated logic, programmable logic, etc.), software (such as instructions run on a processing device), or a combination thereof. In one embodiment, method 500 may be performed by dynamic edit mode mechanism 110 FIG. 1. The processes of method 500 are illustrated in linear sequences for brevity and clarity in presentation; however, it is contemplated that any number of them can be performed in parallel, asynchronously, or in different orders. For brevity, clarity, and ease of understanding, many of the details discussed with reference to other Figures in this document are not discussed or repeated here.

Method 500 begins at block 505 with receiving a request (also referred to as "edit request" or "editing request") for accessing a dynamic edit mode at a computing device. In one embodiment, this edit request may be initiated or placed by the user by simply turning the computing device from one position to another, such as from portrait to landscape or vice versa. At block 510, upon receiving the edit request, any content being accessed by the user at the computing device is detected. At block 515, context associated with the content is evaluated, such as whether the content is being accessed at initial stages (such as accessing superficial information, research data, etc.) or later stages (such as accessing detailed and/or specific information). At block 520, once the context is evaluated, a stage is associated with the content based on the evaluated context, such as a primary stage is associated with the content if the content is still being accessed at initial stages, or a secondary stage is associated with the content if the content is being accessed at later stages.

At block 525, in one embodiment, a determination is made as to whether a primary stage or a secondary stage is associated with the content. At block 530, if the secondary stage is associated with the content, the edit request is interpreted as being accidental or unintentional and consequently, at block 535, the edit request is rejected and access to the dynamic edit mode is denied.

At block 540, in one embodiment, if the primary stage is associated with the content, the edit request is interpreted as being intentional and timely. At block 545, the edit request is granted and access to the dynamic edit mode is allowed. At block 550, any changes proposed by the user via the dynamic edit mode are facilitated in that they are received and accepted or rejected (e.g., changes that are not allowed, such as attempting to move an item in an illegal manner, attempting to delete an application (e.g., operating system) that is not allowed to be deleted, etc.). Upon facilitating the proposed changes, at block 555, a request to exit (also referred to as "exit request" or "exiting request") the dynamic edit mode is received. As with the edit request, the exit request may be received when the user turn the computing device back to its original position, such as from landscape back to portrait or vice versa. At block 560, the exit request is granted and the content may now be accessed by the user at the computing in light of the accepted changes made through the dynamic edit mode.

Figure 4:
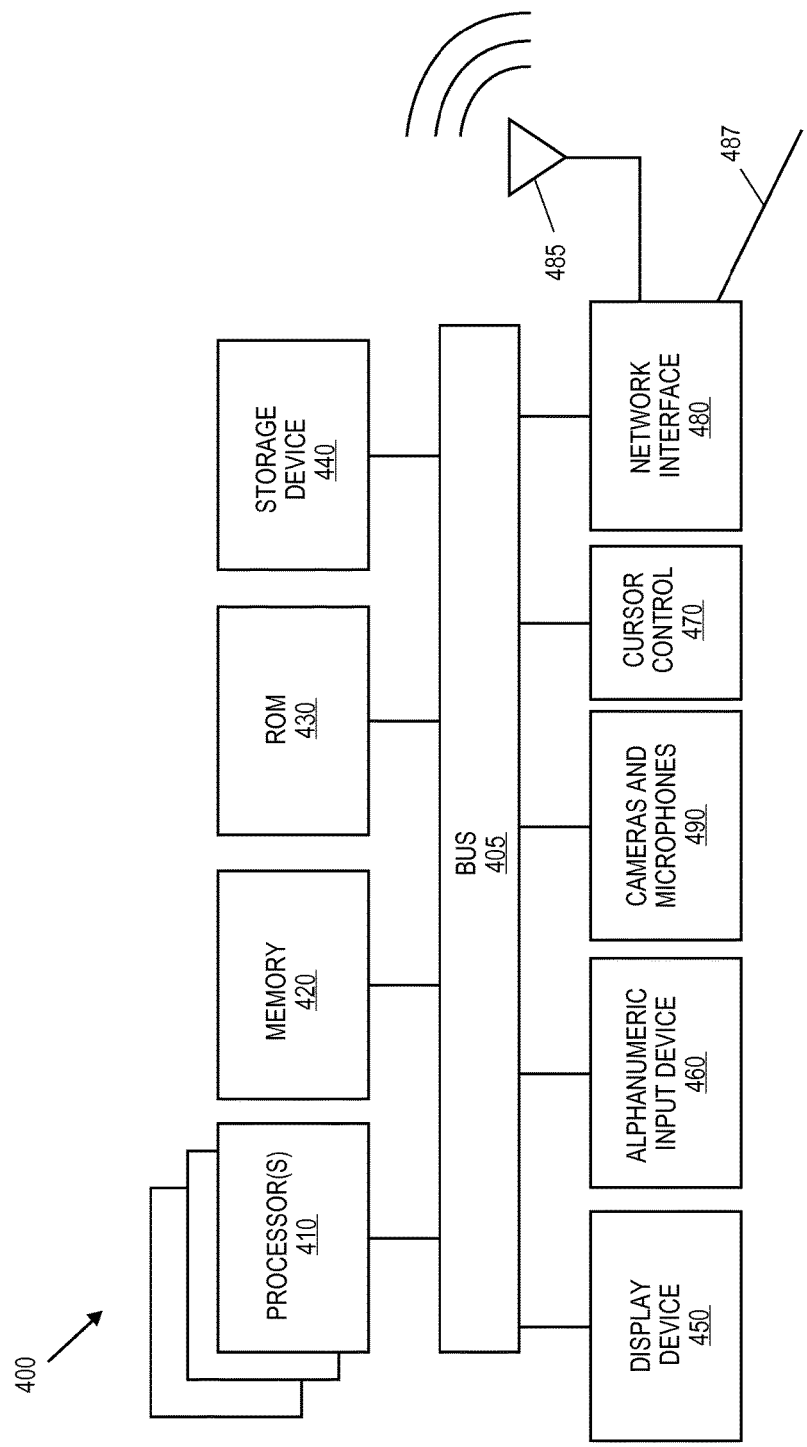
FIG. 4 illustrates computer system suitable for implementing embodiments of the present disclosure according to one embodiment.

Now referring to FIG. 4, it illustrates an embodiment of a computing system 400. Computing system 400 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, etc. Alternate computing systems may include more, fewer and/or different components. Computing device 400 may be the same as or similar to or include host machine 100 of FIG. 1.

Computing system 400 includes bus 405 (or, for example, a link, an interconnect, or another type of communication device or interface to communicate information) and processor 410 coupled to bus 405 that may process information. While computing system 400 is illustrated with a single processor, electronic system 400 and may include multiple processors and/or co-processors, such as one or more of central processors, graphics processors, and physics processors, etc. Computing system 400 may further include random access memory (RAM) or other dynamic storage device 420 (referred to as main memory), coupled to bus 405 and may store information and instructions that may be executed by processor 410. Main memory 420 may also be used to store temporary variables or other intermediate information during execution of instructions by processor 410.

Computing system 400 may also include read only memory (ROM) and/or other storage device 430 coupled to bus 405 that may store static information and instructions for processor 410. Date storage device 440 may be coupled to bus 405 to store information and instructions. Date storage device 440, such as magnetic disk or optical disc and corresponding drive may be coupled to computing system 400.

Computing system 400 may also be coupled via bus 405 to display device 450, such as a cathode ray tube (CRT), liquid crystal display (LCD) or Organic Light Emitting Diode (OLED) array, to display information to a user. User input device 460, including alphanumeric and other keys, may be coupled to bus 405 to communicate information and command selections to processor 410. Another type of user input device 460 is cursor control 470, such as a mouse, a trackball, a touchscreen, a touchpad, or cursor direction keys to communicate direction information and command selections to processor 410 and to control cursor movement on display 450. Camera and microphone arrays 490 of computer system 400 may be coupled to bus 405 to observe gestures, record audio and video and to receive and transmit visual and audio commands.

Computing system 400 may further include network interface(s) 480 to provide access to a network, such as a local area network (LAN), a wide area network (WAN), a metropolitan area network (MAN), a personal area network (PAN), Bluetooth, a cloud network, a mobile network (e.g., 3$^{rd}$ Generation (3G), etc.), an intranet, the Internet, etc. Network interface(s) 480 may include, for example, a wireless network interface having antenna 485, which may represent one or more antenna(e). Network interface(s) 480 may also include, for example, a wired network interface to communicate with remote devices via network cable 487, which may be, for example, an Ethernet cable, a coaxial cable, a fiber optic cable, a serial cable, or a parallel cable.

Network interface(s) 480 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 480 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 480 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 400 may vary from implementation to implementation depending upon numerous factors, such as price constraints, performance requirements, technological improvements, or other circumstances. Examples of the electronic device or computer system 400 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate a dynamic edit mode, comprising: request reception logic to receive a first request for accessing an edit mode at the apparatus, wherein the first request is placed by turning the apparatus from a first position to a second position; and request interpretation and execution logic to allow access to the edit mode, if the first request is determined to be intentional.

Example 2 includes the subject matter of Example 1, further comprising content detection logic to detect content being accessed at the apparatus, wherein the apparatus comprising a computing device.

Example 3 includes the subject matter of Example 1 or 2, further comprising context evaluation and stage assignment logic to evaluate context relating to the content, wherein the context evaluation and stage assignment logic is further to assign a stage to the content, wherein the stage includes a primary stage or a secondary stage.

Example 4 includes the subject matter of Example 3, wherein the primary stage is assigned when the content is being accessed at an initial stage, wherein at the initial stage, the content includes superficial content, and wherein the secondary stage is assigned when the content is being accessed at a later stage, wherein at the later stage, the content includes detailed content.

Example 5 includes the subject matter of Example 1, wherein the request interpretation and execution logic is further to determine whether the first request is intentional or unintentional.

Example 6 includes the subject matter of Example 1 or 5, wherein the first request is regarded as intentional if the content is assigned the primary stage, wherein the intentional first request is granted to allow the access to the edit mode.

Example 7 includes the subject matter of Example 1 or 5, wherein the first request is regarded as unintentional if the content is assigned the secondary stage, wherein the unintentional first request is denied to disallow the access to the edit mode.

Example 8 includes the subject matter of Example 11, wherein the edit mode to facilitate proposed changes to be made to the content.

Example 9 includes the subject matter of Example 1 or 8, wherein the request reception logic is further to receive a second request to exit the edit mode upon completing the proposed changes to the content, wherein the second request is placed by turning the apparatus from the second position to the first position.

Example 10 includes the subject matter of Example 9, wherein the request interpretation and execution logic is further to grant the second request to allow the apparatus to exit the edit mode.

Some embodiments pertain to Example 11 that includes a method for facilitating a dynamic edit mode, comprising: receiving a first request for accessing an edit mode at a computing device, wherein the first request is placed by turning the computing device from a first position to a second position; and allowing access to the edit mode, if the first request is determined to be intentional.

Example 12 includes the subject matter of Example 11, further comprising detecting content being accessed at the computing device.

Example 13 includes the subject matter of Example 11, further comprising evaluating context relating to the content, wherein evaluating includes assigning a stage to the content, wherein the stage includes a primary stage or a secondary stage.

Example 14 includes the subject matter of Example 13, wherein the primary stage is assigned when the content is being accessed at an initial stage, wherein at the initial stage, the content includes superficial content, and wherein the secondary stage is assigned when the content is being accessed at a later stage, wherein at the later stage, the content includes detailed content.

Example 15 includes the subject matter of Example 11, further comprising determining whether the first request is intentional or unintentional.

Example 16 includes the subject matter of Example 15, wherein the first request is regarded as intentional if the content is assigned the primary stage, wherein the intentional first request is granted to allow the access to the edit mode.

Example 17 includes the subject matter of Example 15, wherein the first request is regarded as unintentional if the content is assigned the secondary stage, wherein the unintentional first request is denied to disallow the access to the edit mode.

Example 18 includes the subject matter of Example 11, wherein the edit mode to facilitate proposed changes to be made to the content.

Example 19 includes the subject matter of Example 11, further comprising receiving a second request to exit the edit mode upon completing the proposed changes to the content, wherein the second request is placed by turning the computing device from the second position to the first position.

Example 20 includes the subject matter of Example 19, further comprising granting the second request to allow the computing to exit the edit mode.

Example 21 includes at least one machine-readable medium comprising a plurality of instructions that in response to being executed on a computing device, causes the computing device to carry out operations according to any one of the aforementioned examples 11 to 20.

Example 22 includes at least one non-transitory or tangible machine-readable medium comprising a plurality of instructions that in response to being executed on a computing device, causes the computing device to carry out operations according to any one of the aforementioned examples 11 to 20.

Example 23 includes a system comprising a mechanism to carry out operations according to any one of the aforementioned examples 11 to 20.

Example 24 includes an apparatus comprising means to carry out operations according to any one of the aforementioned examples 11 to 20.

Example 25 includes a computing device arranged to carry out operations according to any one of the aforementioned examples 11 to 20.

Example 26 includes a communications device arranged to carry out operations according to any one of the aforementioned examples 11 to 20.

Some embodiments pertain to Example 27 includes a system comprising a storage device having instructions, and a processor to execute the instructions to facilitate a mechanism to perform one or more operations comprising: receiving a first request for accessing an edit mode at a computing device, wherein the first request is placed by turning the computing device from a first position to a second position; and allowing access to the edit mode, if the first request is determined to be intentional.

Example 28 includes the subject matter of Example 27, wherein the one or more operations further comprise detecting content being accessed at the computing device.

Example 29 includes the subject matter of Example 27, wherein the one or more operations further comprise evaluating context relating to the content, wherein evaluating includes assigning a stage to the content, wherein the stage includes a primary stage or a secondary stage.

Example 30 includes the subject matter of Example 29, wherein the primary stage is assigned when the content is being accessed at an initial stage, wherein at the initial stage, the content includes superficial content, and wherein the secondary stage is assigned when the content is being accessed at a later stage, wherein at the later stage, the content includes detailed content.

Example 31 includes the subject matter of Example 27, wherein the one or more operations further comprise determining whether the first request is intentional or unintentional.

Example 32 includes the subject matter of Example 31, wherein the first request is regarded as intentional if the content is assigned the primary stage, wherein the intentional first request is granted to allow the access to the edit mode.

Example 33 includes the subject matter of Example 31, wherein the first request is regarded as unintentional if the content is assigned the secondary stage, wherein the unintentional first request is denied to disallow the access to the edit mode.

Example 34 includes the subject matter of Example 27, wherein the edit mode to facilitate proposed changes to be made to the content.

Example 35 includes the subject matter of Example 27, wherein the one or more operations further comprise receiving a second request to exit the edit mode upon completing the proposed changes to the content, wherein the second request is placed by turning the computing device from the second position to the first position.

Example 36 includes the subject matter of Example 27, wherein the one or more operations further comprise granting the second request to allow the computing to exit the edit mode.

Some embodiments pertain to Example 37 includes an apparatus comprising: means for receiving a first request for accessing an edit mode at a computing device, wherein the first request is placed by turning the computing device from a first position to a second position; and means for allowing access to the edit mode, if the first request is determined to be intentional.

Example 38 includes the subject matter of Example 37, further comprising means for detecting content being accessed at the computing device.

Example 39 includes the subject matter of Example 37, wherein the one or more operations further comprise evaluating context relating to the content, wherein evaluating includes assigning a stage to the content, wherein the stage includes a primary stage or a secondary stage.

Example 40 includes the subject matter of Example 39, wherein the primary stage is assigned when the content is being accessed at an initial stage, wherein at the initial stage, the content includes superficial content, and wherein the secondary stage is assigned when the content is being accessed at a later stage, wherein at the later stage, the content includes detailed content.

Example 41 includes the subject matter of Example 37, further comprising means for determining whether the first request is intentional or unintentional.

Example 42 includes the subject matter of Example 41, wherein the first request is regarded as intentional if the content is assigned the primary stage, wherein the intentional first request is granted to allow the access to the edit mode.

Example 43 includes the subject matter of Example 41, wherein the first request is regarded as unintentional if the content is assigned the secondary stage, wherein the unintentional first request is denied to disallow the access to the edit mode.

Example 44 includes the subject matter of Example 37, wherein the edit mode to facilitate proposed changes to be made to the content.

Example 45 includes the subject matter of Example 37, further comprising means for receiving a second request to exit the edit mode upon completing the proposed changes to the content, wherein the second request is placed by turning the computing device from the second position to the first position.

Example 46 includes the subject matter of Example 37, further comprising means for granting the second request to allow the computing to exit the edit mode.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
a processor to execute:
    request reception logic to receive a first request for accessing an edit mode at the apparatus, wherein the first request is placed by turning the apparatus from a first position to a second position; and
    request interpretation and execution logic to determine whether the first request is intentional, allow access to the edit mode upon a determination that the first request is intentional, and discard the first request upon a determination that the first request is unintentional; and
    context evaluation and stage assignment logic to evaluate context of content being accessed at the apparatus and assign a primary stage or a secondary stage to the content based on the context, wherein the primary stage is assigned when the content includes superficial content being accessed, wherein the secondary stage is assigned when the content includes detailed content being accessed,
    wherein when the content is assigned to the primary stage, the first request is intentional and the content is allowed to be edited in a dynamic edit mode; and
    when the content is assigned to the secondary stage, the first request is unintentional and the content is not allowed to be in the dynamic edit mode.

2. The apparatus of claim 1, further comprising content detection logic to detect the content being accessed at the apparatus, wherein the apparatus comprising a computing device.

3. The apparatus of claim 1, wherein the edit mode to facilitate proposed changes to be made to the content.

4. The apparatus of claim 3, wherein the request reception logic is further to receive a second request to exit the edit mode upon completing the proposed changes to the content, wherein the second request is placed by turning the apparatus from the second position to the first position.

5. The apparatus of claim 4, wherein the request interpretation and execution logic is further to grant the second request to allow the apparatus to exit the edit mode.

6. A method comprising:
receiving a first request for accessing an edit mode at a computing device, wherein the first request is placed by turning the computing device from a first position to a second position;
determining whether the first request is intentional;
allowing access to the edit mode upon a determination that the first request is intentional;
discarding the first request upon a determination that the first request is unintentional; and
evaluating context of content being accessed at the apparatus and assigning a primary stage or a secondary stage to the content based on the context, wherein the primary stage is assigned when the content includes superficial content being accessed, wherein the secondary stage is assigned when the content includes detailed content being accessed;
when the content is assigned to the primary stage, determining the first request is intentional and allowing the content to be edited in a dynamic edit mode; and
when the content is assigned to the secondary stage, determining the first request is unintentional and not allowing the content to be in the dynamic edit mode.

7. The method of claim 6, further comprising detecting the content being accessed at the computing device.

8. The method of claim 6, wherein the edit mode to facilitate proposed changes to be made to the content.

9. The method of claim 8, further comprising receiving a second request to exit the edit mode upon completing the proposed changes to the content, wherein the second request is placed by turning the computing device from the second position to the first position.

10. The method of claim 9, further comprising granting the second request to allow the computing to exit the edit mode.

11. At least one non-transitory machine-readable medium comprising a plurality of instructions that in response to being executed on a computing device, causes the computing device to carry out one or more operations comprising:
receiving a first request for accessing an edit mode at the computing device, wherein the first request is placed by turning the computing device from a first position to a second position;
determining whether the first request is intentional;
allowing access to the edit mode upon a determination that the first request is intentional;
discarding the first request upon a determination that the first request is unintentional; and
evaluating context of content being accessed at the apparatus and assigning a primary stage or a secondary stage to the content based on the context, wherein the primary stage is assigned when the content includes superficial content being accessed, wherein the secondary stage is assigned when the content includes detailed content being accessed;
when the content is assigned to the primary stage, determining the first request is intentional and allowing the content to be edited in a dynamic edit mode; and
when the content is assigned to the secondary stage, determining the first request is unintentional and not allowing the content to be in the dynamic edit mode.

12. The non-transitory machine-readable medium of claim 11, wherein the one or more operations further comprise receiving a second request to exit the edit mode upon completing the proposed changes to the content, wherein the second request is placed by turning the computing device from the second position to the first position.

13. The non-transitory machine-readable medium of claim 12, wherein the one or more operations further comprise granting the second request to allow the computing device to exit the edit mode.

* * * * *